US012723686B1

(12) United States Patent
Watts et al.

(10) Patent No.: US 12,723,686 B1
(45) Date of Patent: Sep. 1, 2026

(54) LOCKING SEGMENT WITH LOGARITHMIC SPIRAL SURFACE

(71) Applicant: United States Pipe and Foundry Company, LLC, Birmingham, AL (US)

(72) Inventors: Kenneth J Watts, Alpine, AL (US); Jerry Gregory Key, Trussville, AL (US); David J. Farr, Woodstock, AL (US)

(73) Assignee: United States Pipe and Foundry Company, LLC, Birmingham, AL (US)

( * ) Notice: Subject to any disclaimer, the term of this patent is extended or adjusted under 35 U.S.C. 154(b) by 0 days.

(21) Appl. No.: 19/183,759

(22) Filed: Apr. 18, 2025

(51) Int. Cl.
*F16L 21/08* (2006.01)

(52) U.S. Cl.
CPC .................................... *F16L 21/08* (2013.01)

(58) Field of Classification Search
CPC . F16L 21/08; F16L 25/06; F16L 25/08; F16L 37/086; F16L 37/123; F16L 37/15; F16L 37/18; F16L 47/12
USPC .................................................. 285/394, 358
See application file for complete search history.

(56) References Cited

U.S. PATENT DOCUMENTS 1,646,873 A * 10/1927 Richards ................ F16L 37/18 285/332
1,930,194 A * 10/1933 Dillon, V ................ F16L 17/04 285/104
2,005,056 A * 6/1935 Stephens ................ F16L 17/04 285/104
2,641,490 A * 6/1953 Krapp ..................... F16L 37/18 285/309
3,963,298 A * 6/1976 Seiler .................. F16L 37/0845 277/625
4,729,582 A * 3/1988 Zeidler ................. F16L 37/084 285/305
5,060,989 A * 10/1991 Gallucci ................ F16L 21/08 285/337
5,215,337 A * 6/1993 Spirkowyc ............. F16L 47/00 285/305
5,769,462 A * 6/1998 Angell .................... F16L 37/22 285/308
7,266,875 B2 * 9/2007 Longacre ............. F16L 25/065 29/434
11,892,107 B2 2/2024 Corcoran et al.
11,938,549 B2 * 3/2024 Hecht .................. B23B 31/103
11,965,618 B1 * 4/2024 Copeland ................ F16L 21/03
2004/0182123 A1 * 9/2004 Sumimoto .............. B21F 99/00 72/129

(Continued)

*Primary Examiner* — Aaron M Dunwoody
(74) *Attorney, Agent, or Firm* — Paul Sykes; Jacob W. Neu; Bradley Arant Boult Cummings LLP

(57) ABSTRACT

A locking segment is disclosed herein for restraining an outer surface of a spigot of a first pipe to a bell of a second pipe. The locking segment may have a body with an upper surface for contacting the socket of the bell at a contact point, a lower surface with teeth for contacting the outer surface of the spigot, a juncture of the rear side and the lower surface defining a reference point, and a hole extending through a centroid of the body. The upper surface of the locking segment is a logarithmic spiral curved such that a line connecting the contact point to the reference point proximately intersects the centroid. An apparatus can include multiple of the locking segments disposed upon a ring passing through the hole in each of the segments, such that each segment may pivot about the ring.

11 Claims, 4 Drawing Sheets

(56) References Cited

U.S. PATENT DOCUMENTS

| | | | | |
|---|---|---|---|---|
| 2008/0007055 | A1* | 1/2008 | Nohara | F24F 13/0209 285/317 |
| 2011/0084484 | A1* | 4/2011 | German | F16L 37/0845 285/337 |
| 2011/0291409 | A1* | 12/2011 | Kennedy, Jr. | F16L 25/065 285/421 |
| 2018/0023739 | A1* | 1/2018 | Barr | F16L 37/0927 285/317 |
| 2018/0306354 | A1* | 10/2018 | Furcoiu | F16L 19/12 |
| 2018/0306361 | A1* | 10/2018 | Furcoiu | F16L 21/04 |
| 2020/0248848 | A1* | 8/2020 | Furcoiu | F16L 21/007 |

* cited by examiner

LOCKING SEGMENT WITH LOGARITHMIC SPIRAL SURFACE

TECHNICAL FIELD

The present disclosure generally relates to joint pipe locking segment designs, and more particularly to an apparatus and design of locking segments with a logarithmic spiral surface.

BACKGROUND

The present disclosure generally relates to joint pipe locking segment designs. The construction of pipelines generally involves the axial connection of two pieces of pipe to form a single pipeline conduit for transporting materials from one point to another. Along the pipeline there may be one or more fittings, which allow the pipe pieces to be joined to other components in the pipeline. The liquid or gaseous materials usually conveyed via pipelines require that the pipeline conduits and joints between axially-joined pieces of pipe, and between pipes and fittings, be substantially leak-proof. The joint between two pipe may be restrained or unrestrained, as known in the art. One common method for connecting pipe together to form an unrestrained joint involves the insertion of an end of a male piping member ("spigot") into an expanded end of a second pipe, the interior profile of which is specially fabricated to form a socket ("bell socket"). The bell socket is sized to accommodate the spigot end to be received. This connection type is known in the pipe industry as a "push-on joint." U.S. Pat. No. 11,892,107 depicts a push-on joint.

The present disclosure relates to a locking segment for use in a restrained joint. When a pipe is cut in the field, the weld bead on the spigot is lost. A weld bead must be field applied, or a restrained joint gasket must be used to restore the restraint in the pipeline. Current restrained joint pipe locking segment designs translate a force generated by the pressurization of a pipeline to the locking segments in a linear manner, so as the pipeline pressure is increased linearly, a force on the teeth of the locking segment increases linearly. These segments may bind or "lock up" as the pipe's pressure is increased, inhibiting forming a joint of the desired strength. What is needed is an improved method and apparatus for restoring a restrained joint when the weld bead is lost, including a segment design that does not lock up when the pipe is pressurized.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure generally relates to pipe joint locking segment designs, and more particularly to an apparatus and design of locking segments with a logarithmic spiral surface. When a pipe is cut in the field, the weld bead on the spigot is lost. A weld bead must be field applied, or a restrained joint gasket containing locking segments must be used to restore the restraint in the pipeline. The locking segment of the present disclosure can restore a restrained joint after the weld bead is lost. Current restrained joint pipe locking segment designs translate a force generated by the pressurization of a pipeline to the locking segments in a linear manner. As the pipeline pressure is increased linearly, a force on the teeth of the locking segment increases linearly. The locking segment of the present disclosure is designed to instead increase the force on the teeth of a locking segment in a logarithmic manner in response to a linear increase in pipeline pressure. The result of the logarithmic increase in force on the locking segment teeth is a faster response in clamping force on the pipe joint. The locking segment of the present disclosure can be used with the bell to provide a restrained joint on any pipe barrel, as one example.

One aspect of the disclosure is a locking segment for restraining an outer surface of a spigot of a first pipe to a bell of a second pipe, an inner surface of the bell defining a socket. The locking segment includes a body having an upper arcuate surface for contacting the socket of the bell at a contact point, a lower surface comprising a plurality of teeth for contacting the outer surface of the spigot, a front side and a rear side each extending respectfully from the upper arcuate surface to the lower surface, a juncture of the rear side and the lower surface defining a reference point, and a hole extending through a centroid of the body, wherein the upper arcuate surface is a logarithmic spiral curved such that a line connecting the contact point to the reference point proximately intersects the centroid.

Another aspect of the disclosure is an apparatus for restraining an outer surface of a spigot of a first pipe to a bell of a second pipe, an inner surface of the bell defining a socket. The apparatus includes a plurality of the locking segments disposed upon a semi-rigid ring, the ring passing through the hole in each of the segments, such that each segment may pivot about the ring, wherein the ring has a diameter predetermined to place the contact point of each of the locking segments proximate the socket and to place at least one edge of a tooth of each locking segment proximate the spigot. In an alternative embodiment, the segments may be fixed in a predetermined circumferential position on a ring, such as an elastometer ring, but remain free to pivot or rotate about the ring. Any manner of constructing such a ring may be utilized. For example, an elastomeric ring may have sections of reduced diameter spaced part to receive the locking segments and hold them in position while allowing them to rotate in position.

Another aspect of the disclosure is a method of restraining a first pipe to a second pipe, the first pipe comprising a spigot and the second pipe comprising a bell having an inner surface defining a socket. The method includes placing the apparatus for restraining an outer surface of a spigot of a first pipe to a bell of a second pipe into the socket of the bell of the second pipe. The method includes inserting the spigot of the first pipe into the bell of the second pipe. The method includes pressurizing the first and second pipes.

Another aspect of the disclosure is a system. The system includes a first pipe and a second pipe, and the apparatus for restraining an outer surface of a spigot of a first pipe to a bell of a second pipe placed in a socket of the first pipe.

Numerous other objects, advantages and features of the present disclosure will be readily apparent to those of skill in the art upon a review of the following drawings and description of various embodiments.

BRIEF DESCRIPTION OF THE DRAWINGS

The accompanying drawings, which are incorporated in and constitute a part of the specification, illustrate exemplary embodiments of the disclosure. Together with the description, they serve to explain the objects, advantages, and principles of the disclosure.

DETAILED DESCRIPTION

Figure 1:
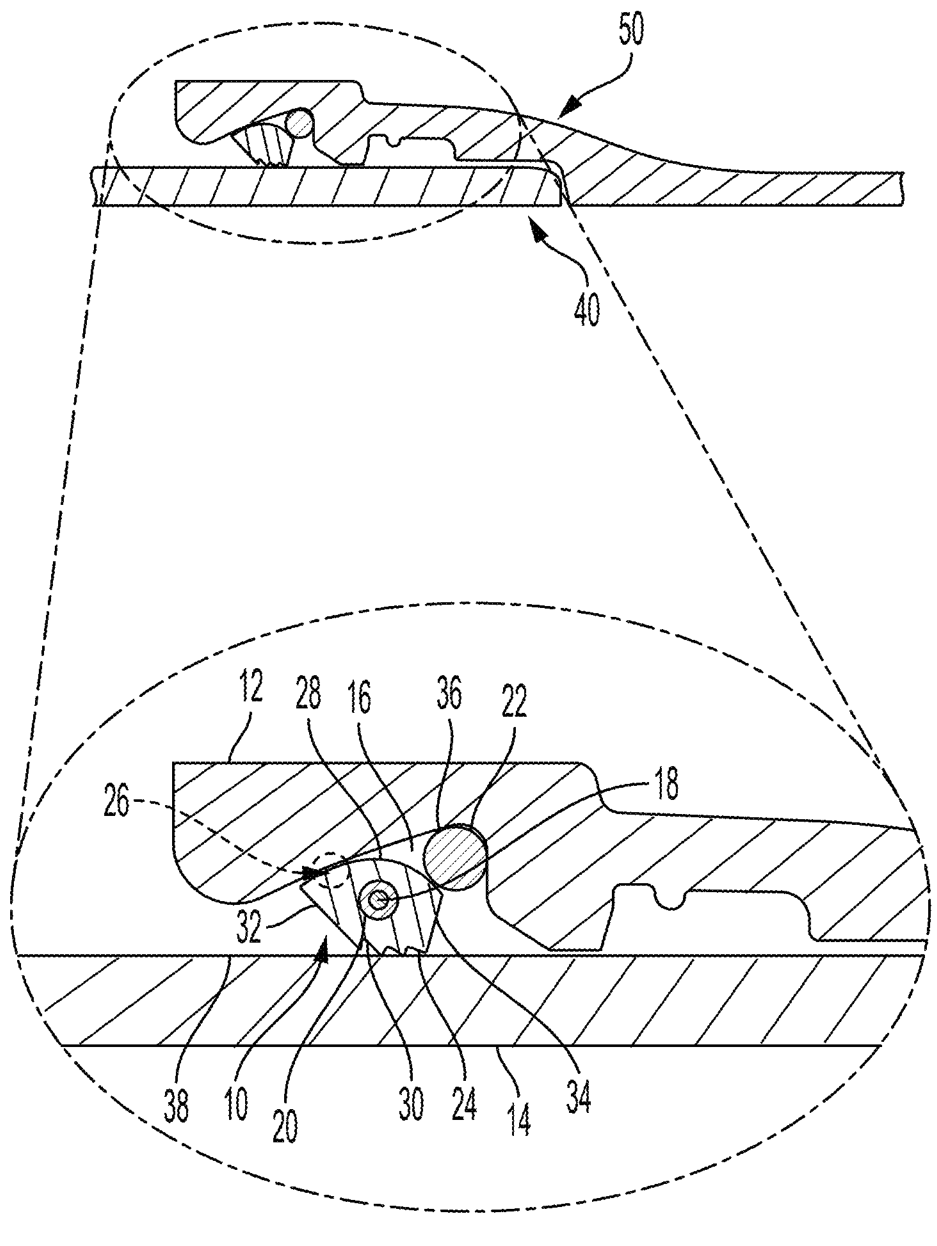
FIG. 1 illustrates a cross-section view of a portion of a pipe joint according to an example embodiment of the present disclosure.

Reference will now be made in detail to exemplary embodiments of the disclosure, some aspects of which are illustrated in the accompanying drawings.

Reference throughout this specification to "one embodiment," "an embodiment," "another embodiment," or similar language means that a particular feature, structure, or characteristic described in connection with the embodiment is included in at least one embodiment. Thus, appearances of the phrases "in one embodiment," "in an embodiment," "in some embodiments," and similar language throughout this specification may, but do not necessarily, all refer to the same embodiment, but mean "one or more but not necessarily all embodiments" unless expressly specified otherwise.

Multiple elements of the same or a similar type may be referred to as "Elements 102(1)-(*n*)" where n may include a number. Referring to one of the elements as "Element 102" refers to any single element of the Elements 102(1)-(*n*). Additionally, referring to different elements "First Elements 102(1)-(*n*)" and "Second Elements 104(1)-(*n*)" does not necessarily mean that there must be the same number of First Elements as Second Elements and is equivalent to "First Elements 102(1)-(*n*)" and "Second Elements (1)-(m)" where m is a number that may be the same or may be a different number than n.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. As used herein, the term "a," "an," or "the" means "one or more" unless otherwise specified. The term "or" means "and/or" unless otherwise specified.

The terms "about" or "approximately" mean within a range of reasonable error around a central value. Such reasonable error may for example stem from the precision of an instrument or method used to measure the value. The error could also stem from the precision of a method of making a structure. For example, in some contexts these terms may mean±/−10%. In others these terms may mean±20%.

The terms "distal" and "proximal" mean directions on a structure that are toward the terminal end (distal) or away from the terminal end (proximal). In the context of this disclosure, "distal" will mean the axial direction toward the open end of the female joint member (i.e., the direction from the constriction toward the groove), and "proximal" will mean the axial direction away from the open end of the female joint member (i.e., the direction from the groove toward the constriction).

The term "axial" in this disclosure refers to the axis of flow in a pipe or similar structure.

The term "circumferential" in this disclosure refers to angular position, motion or direction around a centerline that is parallel to the axis of flow in a pipe or similar structure.

The present disclosure generally relates to pipe joint locking segment designs, and more particularly to an apparatus and design of locking segments with a logarithmic spiral surface. When a pipe is cut in the field, the weld bead on the spigot is lost. A weld bead must be field applied, or a restrained joint gasket must be used to restore the restraint in the pipeline. The locking segment of the present disclosure can restore a restrained joint after the weld bead is lost. Current restrained joint pipe locking segment designs translate a force generated by the pressurization of a pipeline to the locking segments in a linear manner. As the pipeline pressure is increased linearly, a force on the teeth of the locking segment increases linearly. The locking segment of the present disclosure is designed to instead increase the force on the teeth of a locking segment in a logarithmic manner in response to a linear increase in pipeline pressure. The result of the logarithmic increase in force on the locking segment teeth is a faster response in clamping force on the pipe joint. The locking segment of the present disclosure can be used with the pipe bell to provide a restrained joint on any pipe barrel, as one example.

FIG. 1 illustrates a cross-section view of a portion of a pipe joint according to an example embodiment of the present disclosure. In FIG. 1, a locking segment 10 is shown in a resting state (in the absence of forces exerted upon it in an angularly or radially displaced joint). A spigot-bell pipe joint is broadly defined as one in which the bell end 12 of a second pipe 50 receives the spigot end 14 of a first pipe 40. The bell 12 has a receiving end fashioned to receive the spigot end 14 of the first pipe 40. The fashioned inner surface of the bell 12 is the socket 16. Each pipe has an outer surface and an inner surface. When joined, the outer surface 38 of the spigot end 14 of the first pipe 40 fits within the inner surface 36 of the bell end 12 of the second pipe 50. As shown in FIG. 1, the pipe 40 spigot 14 is partially disposed within the pipe 50 bell 12 in such a manner that there is some annular gap between the two, but the locking segment 10 has a greater radial height than the annular gap. Accordingly, the locking segment 10 cannot pass through the annular gap. The outer surface of the spigot end 14 is typically smooth and has a uniform diameter, The locking segment 10 can secure the outer surface 38 of the spigot end 14 of the first pipe 40 to the inner surface 36 of the bell end 12 of the second pipe 50. The shown embodiments are pipes and bells of metal, such as ductile iron, however other materials may be used in other embodiments.

The body of the locking segment 10 may have an upper arcuate surface 28 for contacting the socket 16 of the bell 12 at a contact point 26. The lower surface 30 of the locking segment 10 may have teeth 24 for contacting the outer surface 38 of the spigot 14 of the first pipe 40. The locking segment 10 may also have a front side 32 and a rear side 34 that extend from the upper surface 28 to the lower surface 30. A reference point is defined by a juncture of the rear side 34 and the lower surface 30. For example, there may be three teeth 24, each tooth terminating in an edge for bearing against the spigot 14 with the edge of the rearmost tooth formed by the juncture of the rear side 34 and the lower surface 30 and the frontmost tooth having an edge formed by the juncture of the front side 32 and the lower surface 30. The locking segment 10 can have a hole located approximately at the centroid of the locking segment 10.

The design of the locking segment 10 can be based on a logarithmic spiral contact surface, where the upper arcuate surface 28 is a logarithmic spiral contact surface such that there is a line connecting the contact point 26 to the reference point proximately intersecting the centroid of the locking segment 10. A logarithmic spiral contact surface for a locking segment 10 can be determined by the method described below with reference to FIGS. 3 and 4. As shown in FIG. 1, a locking segment 10 is inserted into the pipe bell 12 and disposed in the bell groove prior to insertion of the pipe spigot 14 into the pipe bell 12. A continuous rod 18 (i.e., a semi-rigid ring) can go through the hole located approximately at the centroid in the locking segment 10. The locking segment 10 is free to rotate about the rod 18. In some embodiments, the rod 18 may be a wire made of steel or another metal. A plurality of tubes 20 may fit over the rod 18, but which have an outer diameter larger than the hole in the locking segment 10, may be used to allow for spacing between locking segments around the circumference of the bell 12 when there are multiple locking segments linked together. A resilient O-ring 22 (or similar elastomeric annular member) may also be placed in the bell socket 16, the O-ring 22 having such a rigidity to provide a force against each locking segment to properly position the teeth 24 of each locking segment 10 while yielding to provide a low assembly force for the pipe joint. The diameter of the O-ring 22 may be predetermined to allow it to fit snugly between a rearward portion of the upper surface 28 of each of the locking segments 10 and the socket 16 of the bell 12. The O-ring 22 may be a continuous tube. In some embodiments, the tube 20 and the O-ring 22 are made of plastic or rubber. In some implementations, in the design of the logarithmic spiral locking segment 10 assembly in the bell 12, the O-ring 22 may keep the locking segment 10 in place during assembly of the joint.

Figure 2:
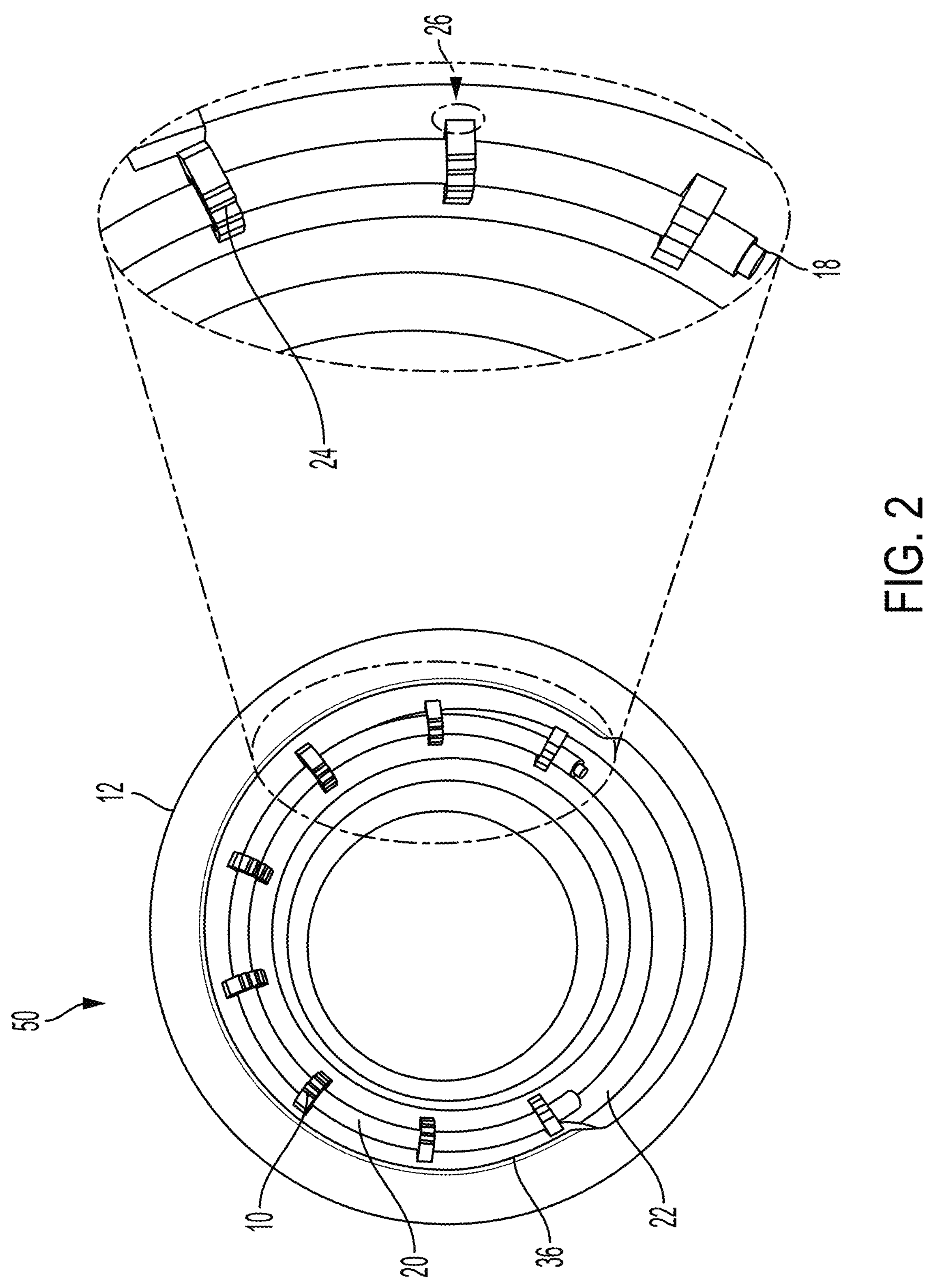
FIG. 2 illustrates a front view of a bell with a series of locking segments according to an example embodiment of the present disclosure.

A pipe assembly can have more than one locking segment 10, each with a logarithmic contact surface. In the example of FIG. 2, eight locking segments 10 are linked together inside the bell 12. The locking segments 10 can be linked to each other by the rod 18 that goes through the hole in the centroid of each locking segment. The spacing between the locking segments 10 can be established by placing the tube 20 over the rod 18, where the length of the tube 20 determines the spacing between the locking segments 10. The rod 18 may have a diameter predetermined to place the contact point 26 of each of the locking segments 10 proximate the socket 16 and to place at least one edge of a tooth 24 of each locking segment 10 proximate the spigot 14.

The mechanism of the locking joint, as depicted in FIG. 1, includes pressurizing the pipe joint as follows. The spigot 14 of the first pipe 40 is inserted into the bell section 12 of the second pipe 50, which has the locking segments 10 apparatus placed in the socket 16. The gasket 22 can also be fitted in the socket 16 of the bell 12 of the second pipe 50 before the locking segments 10 apparatus is placed in the socket 16. As the bell section 12 and the spigot section 14 begin to move apart under the force generated by a linearly applied pressurization, the teeth 24 engage the spigot 14. A force is applied to the teeth 24 and generated at the contact point 26 between the bell 12 and the logarithmic spiral locking segment 10. As linear pressurization of the joint continues, the locking segment 10 is free to rotate around the rod 18 located at approximately the centroid of the locking segment 10. The bell 12 moves along the logarithmic spiral surface of the locking segment 10 at the contact point 26. The force created at the contact point 26 is transferred through the locking segment 10 to the teeth 24 in a logarithmic manner in response to the linearly applied joint pressurization. This action results in a rapid clamping of the locking segment 10 in the pipe joint.

Figure 3:
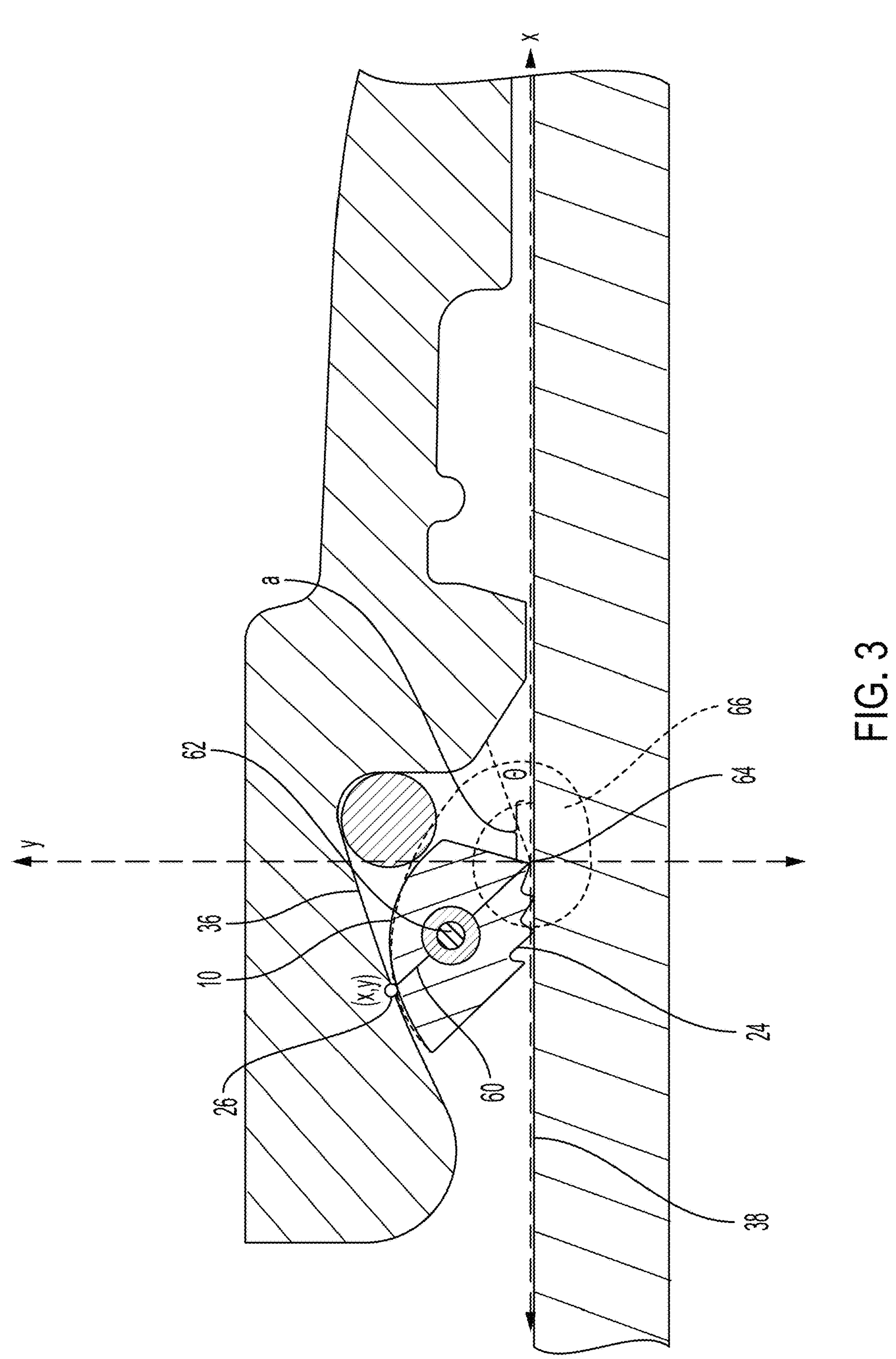
FIG. 3 illustrates a method of designing a locking segment according to an example embodiment of the present disclosure.
Figure 4:
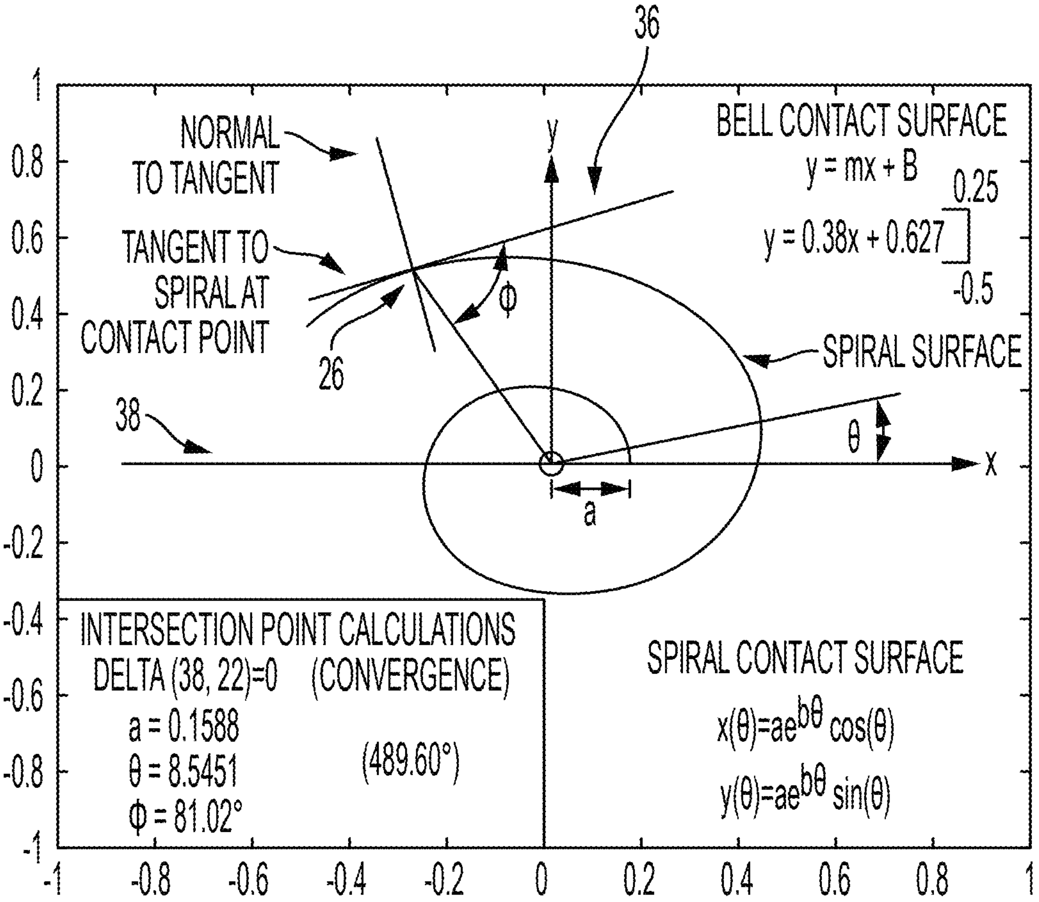
FIG. 4 illustrates a method of designing a locking segment according to an example embodiment of the present disclosure.

FIG. 3 illustrates parameters used in a method of designing a locking segment 10 according to an example embodiment of the present disclosure. FIG. 4 illustrates an example implementation of the method of designing a locking segment 10. The design of the locking segment 10 can be based on a logarithmic spiral contact surface. This design depends on the solution of a set of mathematical equations that define a contact point 26 (x, y) between a pipe bell 12 and a logarithmic spiral locking segment 10. The contact point 26 on the bell 12 is an x, y coordinate of a point along a straight line with the equation $y=mx+B$ (hereinafter, "Equation 1"), where x represents the x-axis being the outer surface 38 of the spigot 14 and y represents a y-axis in relation to the x-axis, m is the slope of the inner surface 36 of the bell 12, and B is a point on the y-axis of the inner surface 36 of the bell 12 (m and B can be determined based on measurements of the bell and spigot). The Cartesian equations for the contact point 26 on the spiral locking segment 10, in terms of x and y coordinates, is given as: $x(\theta)=ae^{b\theta}\cos\theta$ and $y(\theta)=ae^{b\theta}\sin\theta$ (hereinafter, "Equations 2"), where θ is the angle between the reference point and the slope of the inner surface 36 of the bell 12, a is the range of the logarithmic spiral, and b is the cotangent of the angle ϕ between the radius and a line tangent to a. As values for a and θ are substituted into Equation 2, a logarithmic spiral is generated based on the resulting x and y values. The contact point 26 between the bell 12 and the logarithmic spiral locking segment 10 is found where the line of Equation 1 intersects the logarithmic spiral locking segment of Equation 2. At the contact point 26, the inner surface 36 of the bell 12 is tangent to the logarithmic spiral.

This contact point 26 between the bell 12 and the logarithmic spiral locking segment 10 can be found by substituting Equations 2 for Equation 1, the result being $ae^{b\theta}\sin\theta=mae^{b\theta}\cos\theta+B$ (hereinafter, "Equation 3"). Equation 3 can be further simplified (hereinafter, "Equation 4") as follows:

$$ae^{b\theta}\sin\theta - mae^{b\theta}\cos\theta = B$$

$$e^{b\theta}\sin\theta - me^{b\theta}\cos\theta = \frac{B}{a}$$

$$e^{b\theta}(\sin\theta - m\cos\theta) = \frac{B}{a}$$

Because Equation 4 is transcendental, numerical analysis may be used to obtain a solution. For instance, fixed point iteration convergence can be used to solve Equation 4 by dividing Equation 4 into a right-hand side (RHS) and a left-hand side (LHS):

$$LHS = e^{b\theta}(\sin\theta - m\cos\theta)$$

$$RHS = \frac{B}{a}$$

$$\Delta = LHS - RHS$$

The variables θ and a are iterated through a range of values while the difference between the right-hand side and the left-hand side of the equation, delta (Δ) is calculated. The equation has converged when delta equals zero and thus the solution is found. This method of equations may be derived for each nominal pipe size. Where the equation converges ($\Delta=0$), the values ($\theta$, a) can be used to find the contact point 26 between the bell 12 and the logarithmic spiral locking segment 10 (x, y).

In some implementations, the logarithmic spiral contact surface for a locking segment 10 can be determined by the method of designing the locking segment 10 with a program (e.g., in MATLAB or other software program) that can also output a file that allows for the spiral contact surface points to be drawn by executing the file (e.g., an AUTOCAD script file). The leftmost end of the profile of the teeth 24 is inserted at a point which is the midpoint of the curved bell surface above it. The teeth immediately to the right of the left endpoint of the profile (e.g., two of the teeth) will rest on the spigot 14. The program can generate the logarithmic spiral section 10 between two values of theta ($\theta$). The endpoints of the logarithmic spiral section 10 and the teeth 24 can be connected with lines. The centroid 62 of the segment can be calculated, and the centroid 62 needs to be on or very near a line 60 drawn from the contact point 26 to the rightmost endpoint of the teeth 64. If the centroid 62 is not on or very near the line 60, the range of theta ($\theta$) in the program can be changed to generate a new logarithmic spiral section. This process can be repeated until the centroid 62 is on the line 60. When the condition is satisfied, the design of the locking segment 10 is complete.

The presently disclosed apparatus, systems, and methods have a wide application anywhere in the piping industry where restrained pipe joints are needed. One particularly important application for the disclosure described herein relates to pressurized pipelines. However, the apparatus, systems, and methods described above could be utilized in other contexts.

Those skilled in the art will recognize improvements and modifications to the preferred embodiments of the present disclosure. All such improvements and modifications are considered within the scope of the concepts disclosed herein and the claims that follow.

While the making and using of various embodiments of the present disclosure are discussed in detail herein, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those skilled in the art will recognize, or be able to ascertain, using no more than routine experimentation, numerous equivalents to the specific substances and procedures described herein. Such equivalents are considered to be within the scope of this disclosure and are covered by the following exemplary claims.

Furthermore, the described features, structures, or characteristics of the disclosure may be combined in any suitable manner in one or more embodiments. In the description contained herein, numerous specific details are provided to provide understanding of embodiments of the disclosure. One skilled in the relevant art will recognize, however, that the disclosure may be practiced without one or more of the specific details, or with other methods, components, materials, apparatuses, devices, systems, and so forth. In other instances, well-known structures, materials, or operations may not be shown or described in detail to avoid obscuring aspects of the disclosure.

What is claimed is:

1. A locking segment for restraining a pipe joint, the locking segment comprising:

a body having an upper arcuate surface for contacting a socket defined by an inner surface of a bell of a first pipe at a contact point, a lower surface comprising a plurality of teeth for contacting an outer surface of a spigot of a second pipe, a front side and a rear side each extending respectfully from the upper arcuate surface to the lower surface, a juncture of the rear side and the lower surface defining a reference point, and a hole extending through a centroid of the body, wherein the upper arcuate surface is a logarithmic spiral curved such that a line connecting the contact point to the reference point proximately intersects the centroid when the locking segment is inserted into the socket and the spigot is inserted into the bell.

2. The locking segment of claim 1, wherein the lower surface comprises at least three teeth, each tooth terminating in an edge for bearing against the spigot, and the edge of a rearmost tooth is formed by the juncture of the rear side and the lower surface.

3. The locking segment of claim 1, further comprising a frontmost tooth having an edge formed by a juncture of the front side and the lower surface.

4. An apparatus for restraining an outer surface of a spigot of a second pipe to a bell of a first pipe, the apparatus comprising:

a plurality of the locking segments of claim 1 disposed upon a ring, the ring passing through the hole in each of the segments, such that each segment may pivot about the ring, wherein the ring has a diameter predetermined to place the contact point of each of the locking segments proximate a socket defined by an inner surface of the bell and to place at least one edge of a tooth of each locking segment proximate the spigot.

5. The apparatus of claim 4, further comprising a plurality of resilient tubes, each tube having an outer diameter larger than the hole in each of the locking segments, each tube disposed around the ring between two locking segments to maintain the locking segments in a predetermined spaced relationship.

6. The apparatus of claim 5, further comprising a resilient O-ring having a diameter predetermined to allow a gasket to fit snugly between a rearward portion of the upper surface of each of the locking segments and the socket of the bell.

7. A method of restraining a first pipe to a second pipe, the first pipe comprising a bell having an inner surface defining a socket and the second pipe comprising a spigot, the method comprising:

placing the apparatus of claim 4 into the socket of the bell of the first pipe;

inserting the spigot of the second pipe into the bell of the first pipe; and pressurizing the first and second pipes.

8. The method of claim 7, further comprising, before the placing step, fitting a resilient O-ring having a diameter predetermined to allow a gasket to fit snugly between a rearward portion of the upper surface of each of the locking segments and the socket of the bell.

9. A system comprising a first pipe and a second pipe, and the apparatus of claim 4 or 5 placed in a socket of the first pipe.

10. A method of designing a locking segment having a body comprising an upper surface defined by a logarithmic spiral for restraining a spigot of a first pipe to a bell of a second pipe, the bell having an inner surface oriented at a slope relative to an outer surface of the spigot when the spigot of the second pipe is inserted into the bell of the first pipe along a common longitudinal axis, the method comprising:

providing a representation of the spigot of the first pipe inserted within the bell of the second pipe to a predetermined position at which the spigot is to be restrained, calculating a contact point between the upper surface of the locking segment and the inner surface of the bell based upon an angle θ between a first line on the outer surface of the spigot and the slope of the inner surface of the bell, wherein the first line originates from a reference point on the spigot's outer surface, and a range a of the logarithmic spiral as measured from the reference point, such that a second line connecting the reference point to the contact point proximately intersects a centroid of the body of the locking segment, and the upper surface of the locking segment is tangent to the inner surface of the bell at the contact point.

11. The method of claim 10, wherein the representation is selected from the group consisting of: a graphical representation, a digital representation, and a physical representation.

* * * * *